US010045091B1

United States Patent
Nijim et al.

(10) Patent No.: US 10,045,091 B1
(45) Date of Patent: Aug. 7, 2018

(54) SELECTABLE CONTENT WITHIN VIDEO STREAM

(71) Applicant: Cox Communications, Inc., Atlanta, GA (US)

(72) Inventors: Yousef Wasef Nijim, Roswell, GA (US); Jay Paul Langa, Cumming, GA (US); James Alan Strothmann, Johns Creek, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 179 days.

(21) Appl. No.: 14/042,497

(22) Filed: Sep. 30, 2013

(51) Int. Cl.
  *H04N 7/10* (2006.01)
  *H04N 7/025* (2006.01)
  *H04N 21/81* (2011.01)

(52) U.S. Cl.
  CPC .................. *H04N 21/812* (2013.01)

(58) Field of Classification Search
  CPC ............. H04N 21/812; H04N 21/8126; H04N 21/8133; H04N 21/4316; H04N 21/431; H04N 21/4722; H04N 21/4725
  USPC ................................................... 725/60, 112
  See application file for complete search history.

(56) References Cited

U.S. PATENT DOCUMENTS

| | | | | |
|---|---|---|---|---|
| 2003/0014752 | A1* | 1/2003 | Zaslavsky | H04N 21/4316 725/40 |
| 2008/0282285 | A1* | 11/2008 | Thomas et al. | 725/32 |
| 2010/0154007 | A1* | 6/2010 | Touboul et al. | 725/60 |
| 2010/0312596 | A1* | 12/2010 | Saffari | G06Q 30/0203 705/7.32 |
| 2011/0145847 | A1* | 6/2011 | Barve | H04H 60/64 725/9 |
| 2013/0339857 | A1* | 12/2013 | Garcia Bailo | G06F 3/0484 715/723 |

* cited by examiner

*Primary Examiner* — Kunal Langhnoja
(74) *Attorney, Agent, or Firm* — Merchant & Gould

(57) ABSTRACT

Selectable content is provided within a video stream. Additional content such as advertisements or other information that may be of interest to a user is provided in an interactive fashion providing a richer and deeper viewing experience and giving more control to the user during video viewing. Prescreening of the video content may be done and tags may be inserted in the video stream in association with additional content that may be provided for tagged objects in the video stream. An indication may be provided to the user indicating the availability of additional interactive content in a variety of ways. Upon user request, the content associated with the tags may be presented to the user. The additional content may be provided to the user in a hybrid fashion which involves rendering the video content and additional interactive content simultaneously or by enabling full screen browsing experience.

17 Claims, 10 Drawing Sheets

SELECTABLE CONTENT WITHIN VIDEO STREAM

BACKGROUND

Video consumers today have embraced the interactive television (TV) system that offers a unique and enjoyable experience. Growing number of consumers choose viewing content via streaming alternatives because they like more control over the video content. In addition, the way people use devices while accessing content is also changing as "multi-screening" or the use of multiple screens simultaneously has become a new norm. More consumers use a second device in some capacity while watching television. This media multitasking may be great for consumers, but with people dividing their attention between screens, the pressure may be increased on advertisers, content creators, content providers etc., to create compelling, engaging viewing experiences that span devices and content delivery systems. Additionally, in-stream advertising holds the potential to tell advertisers when and whether viewers viewed an ad, whether they follow through on embedded calls-to-action, and so forth. This may require taking a holistic approach to the content strategy, to adjustment of advertising to fit the consumer's multi-screen behavior, and to the context of how the consumers use each device.

It is with respect to these and other considerations that the present invention has been made.

SUMMARY

Embodiments of the present invention provide for selectable content within a video stream. Currently while a user consumes the video content via a television or other device capable of displaying linear or recorded video content, interaction with the video stream is limited or unavailable altogether. In many cases, viewers may need or desire to get more information about aspects of viewed content (e.g., items or objects contained in viewed content, characters in viewed programs, etc.) while consuming the video stream or while viewing the advertisement commercials or information offerings during commercial or other breaks in regular programming. For example, if a product is displayed in a scene of a television show or in advertisement video, users/viewers may be able to view such items, but may not have the ability to actually interact those items for obtaining more information or for acquiring the items, if desired.

Embodiments of the invention provide for tagging portions or items contained in a streamed video such that selection (e.g., clicking on) a tagged portion or item causes provision of information on or access to the tagged portion or item. For example, a cereal box shown on a kitchen counter in a popular television show may be tagged, and an indication of the tagging may be provided to a viewing user. If the viewing user selects the tagged item (e.g., cereal box), information (including acquisition information) about the tagged item may be provided to the user in a banner or other display window to allow the viewing user to interact with the tagged item.

According to embodiments, prescreening of video content may be performed and tags may be generated and inserted into the associated video stream in association with various items (objects, people and scenes) that may be viewed by the user while consuming the video. Selection of tags inserted into the video stream may cause provision of various additional and interactive content items. An indication may be provided to the user indicating the availability of additional interactive content associated with the video content in a variety of different ways. The additional interactive content may be provided to the user in a hybrid fashion which may involve rendering the video content and additional interactive content simultaneously. The additional interactive content associated with the inserted tags may be static, or may be dynamically updated based on one or more factors, such as time of day, content (additional interactive content available or video content being played), user location, user's viewing patterns, parental controls, action by the user or content provider, etc.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

FIGS. 2A, 2B and 2C are illustrations of a user interface with which an indication of the availability of interactive content may be provided.

DETAILED DESCRIPTION

Figure 1:
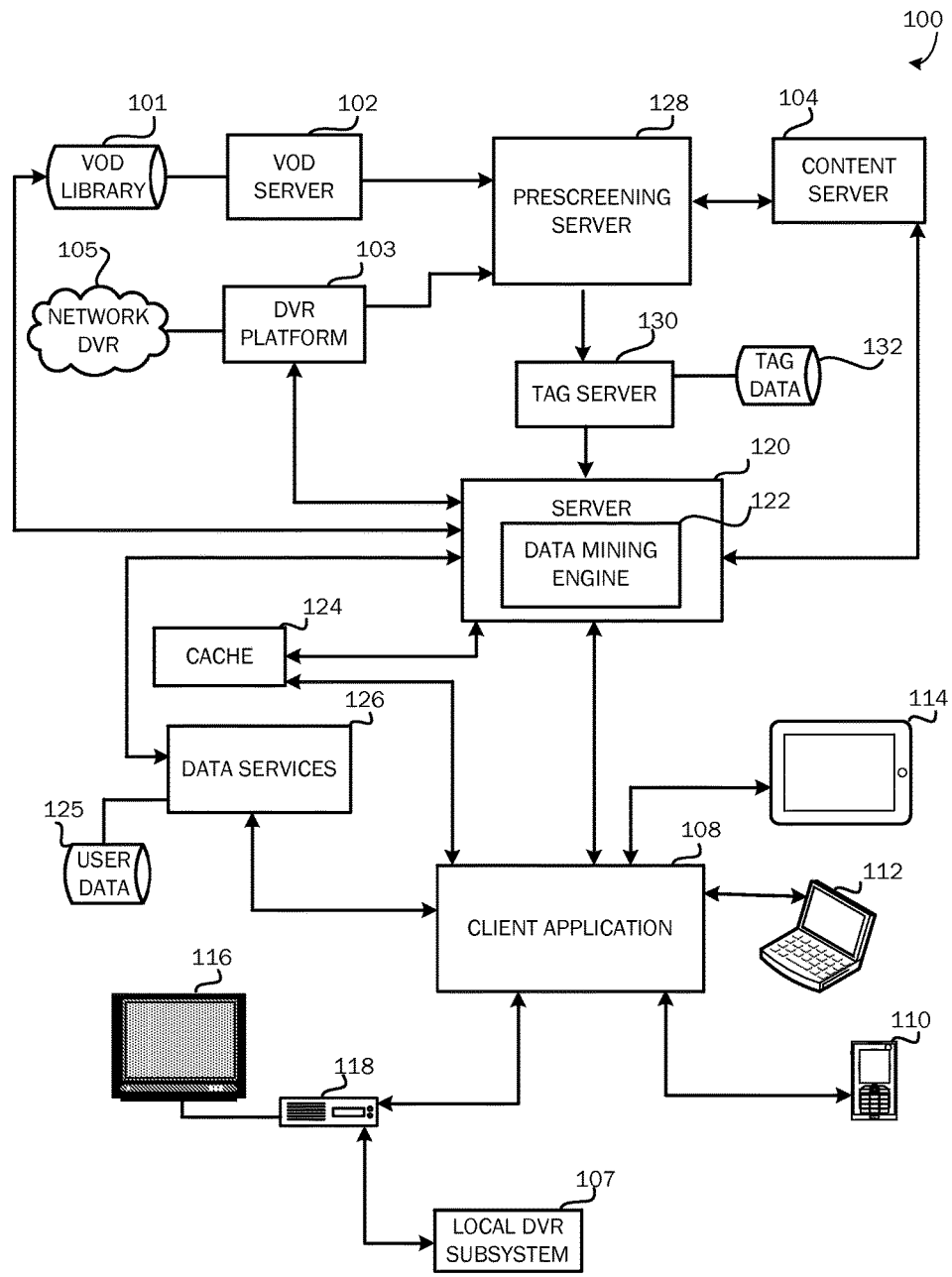
FIG. 1 is a simplified block diagram of a system for providing selectable advertising within a video stream.

As briefly described above, embodiments provide for selectable interactive content associated with tagged portions or items of displayed video content. One or more portions or items for which additional information may be provided are tagged. An indication of the tagging is provided to a viewing user. Selection of a tagged portion or item via a suitable selection means, such as a television remote control button, a touch selection on a touch capable device, voice selection, gesture selection, etc., causes display of the additional information. The additional information may be displayed in a display that temporarily replaces a display of the presently being viewed content, or the additional information may be displayed in a banner or display window that allows the viewing user to view both the presently being viewed content and the additional information simultaneously. The additional information may be descriptive information or may include interactive content such as an active internet-based web page that allows the user to interact with the additional information, including navigation to other information associated with the additional information.

Embodiments provide for prescreening of the video content for determining what portions or items in the video content may or should be tagged for provision of additional content. Video content may be available from any number of suitable sources and may be in the form of prerecorded digital video recordings (DVR recordings), video-on-demand (VOD) content, Internet-available content, such as YouTube®, Hulu®, etc., as well as linear content broadcasts. Based on a viewer's demographic information, taste profile, day/time of viewing, location of viewing, viewing history, viewer household demographics, device in use, etc., different segments or objects in the video stream may be identified as potential areas where tags may be inserted in association with additional content so that the additional content may be made available to the user in addition to regularly provided advertisement commercials or other informational content.

According to embodiments, when various different types of video content are received by the content provider that may be made available to the user in a linear or non-linear fashion, there may be an extensive amount of additional interactive content that may be made available and that may be of interest to the user. For example, product information may be available for various products displayed as part of a video content item. Biographical information may be available about actors in the video content item, historical information may be available about the storyline or other aspects of the video content item, and the like. In addition, one or more resources may be available in association with aspects of a video content item. For example, one or more Internet-based resources may be available for providing additional interactive information in association with one or more aspects of a video content item.

For example, if the user is viewing a popular television show, various objects may be presented as part of the video content of the show. For example, various products (e.g., automobiles, food items, clothing items) may be presented, various characters (fiction and non-fiction) may be depicted, various locations/scenes may be depicted, and the like. According to embodiments, a content provider may tag one or more of these items and an on-screen indication of the presence of the tag(s) may be provided. Additional content (either inserted directly into the video content item stream or accessible via an embedded or associated link) may be associated with each tagged item. Upon selection of a given tagged item, as described below, the associated additional content may be provided. For example, if a cereal box is displayed on a kitchen counter in the being viewed television show, the cereal box may be tagged by the content provider. Selection of the tagged cereal box may provide the user information on the cereal brand including nutritional information or information on how to purchase the tagged cereal brand. For another example, a given actor present in a given scene may be tagged such that selection of the tagged actor causes a provision of biographical information about the actor or about the character being portrayed by the actor.

The tagged objects (e.g., people, places and things) may be highlighted in the displayed video via several means that may attract the user's attention. For example, a tagged object may appear three dimensional to set it apart from other displayed objects. A bold line may be displayed around the tagged object. The tagged object may be framed. An icon or object (such as a star symbol) may be displayed on or near the tagged object. A text string such as "info" or the like may be displayed on or near the tagged object, or the like. As should be appreciated, any suitable highlighting for alerting a user that additional information may be available in association with a given displayed object in the video presentation will suffice.

According to embodiments, once the user/viewer selects a given tagged object as described below, the additional interactive content may be presented to the user. The additional interactive content may be presented to the user in a number of different ways such as a split on the display screen with the additional interactive content and the video content simultaneously rendered to the viewer, or the additional interactive content may take form of a browser window which may be overlaid on top of the video content display.

In the case of linear content delivery, a check may be performed whether the user's system/device/video content provider has the ability to record the linear content. If recording is available, then the user may be given an option to record the linear video while consuming the additional content. If the user chooses to record the linear content while consuming the additional content, then, once the additional interactive content is delivered, the user may be switched back to the same point of the video content from which he/she departed viewing for receiving the additional information. If recording is not available, or if the user chooses not to record, when the user finishes consuming the additional interactive content and is switched back to the video content display, then he/she may be taken to that point of the linear video that is being presented playing at the current time. As should be appreciated, where split screen capability is present, then the additional information may be provided in a separate screen from the being viewed linear programming simultaneous with the linear programming.

In case of non-linear video content delivery, when the user chooses to consume the additional interactive content at a specific time during the non-linear video content delivery, the non-linear video content may in effect be paused by inserting the additional content into the stream of the previously recorded video content. When the user finishes consuming the additional content, he/she may be taken to the same point of the non-linear content from which he/she departed to consume the additional content. As with linear video programming, where split screen capability is present, then the additional information may be provided in a separate screen from the being viewed non-linear programming simultaneous with the linear programming.

Embodiments of the present invention may be applied to any video decoding display device that can run an associated Internet browser as part of the user interface application layer. For example, devices may include, but are not limited to, a mobile communication device such as a mobile phone, a computing device, such as a desktop computer, a laptop computer, etc., a wireless computing device, such as a tablet computing device, a television, such as an Internet-connected television or a television connected to a network-connected device, such as a set top box (STB). In the case of additional information associated with tagged objects that is inserted directly into a video stream, then any display device capable of receiving selection of a tagged object and capable of playing the inserted information, such as a conventional television unit, may be used in accordance with embodiments of the invention.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

FIG. 1 is a simplified block diagram of a system 100 for providing selectable additional content within a video stream as described herein. Components of the system 100 may operate as a distributed system where each component is accessed via a suitable network, or the components may operate together as an integrated system. As illustrated, content server 104, prescreening server 128, tag server 130, network DVR platform 103, local DVR subsystem 107 and VOD server 102 may be provided.

Content server 104 may include video content data and metadata available via a service provider, such as cable television (CATV) services system (as illustrated and described below with reference to FIG. 6), satellite television provider, or a provider on the Internet such as YouTube®, Hulu®, etc. The data and metadata may include information such as video content title, storyline, cast, genre, rating, release date, images, etc. Content server 104 may also include the various advertisements, third party sponsored content, and various other content provided by the content owner, content provider etc., referred to as additional interactive content, that may be of interest to the viewer.

Prescreening server 128 may perform the function of prescreening all the video content available, which may include but is not limited to the DVR content that may be available via the local DVR subsystem 107, the network DVR Platform 103, VOD content available via the VOD server 102, linear content available via the content server 104 etc. The prescreening function may be performed such that the additional interactive content available to the content provider (such as the additional interactive content by the content provider, content owner, sponsored content, advertisements, sponsored third party content, other content available on the network that may be of interest to the user, etc.) may be associated with tagged objects within the video stream. Following from the cereal box example described above, additional content available to the content provider, such as information on the various retailers that may carry the cereal box brand or a manufacturer's coupon for the product may be made available upon selection of an associated tagged object. This additional information associated with the objects within the video stream may be identified and tags may be inserted to provide an indication to the user of the availability of additional interactive content for the tagged objects.

According to embodiments, personalized prescreening of the content may be done on a user by user basis, household by household basis, etc. For example, if a certain household has young viewers, the identification and insertion of tags may take into account the type of additional interactive content that will be of interest to the users of that specific household, based on the demographics, viewing patterns, day/time, viewer location, content available to the content provider, etc. Tags may also be identified and inserted based on prior access patterns of additional interactive content. The prescreening server 128 may take into account what type of additional content a viewer of a particular household is interested in at a particular point of time and may identify the additional information based on that information.

The prescreening server 128 may also take into account the motion in the scenes of a particular video content, while it is performing the prescreening function, to take into account which scenes within the video stream have fairly static objects. For example, if a user is viewing a given television show having a scene containing a high speed car chase, the scene may not be optimized for being tagged for additional interactive content or information, because tagged information may move out of the display too quickly to allow a user to select a tagged object (e.g., a moving car or character). On the other hand, a scene in which one or more characters may be sitting or standing in one location for a sufficient amount of time (e.g., 20 seconds) allow for tagging presented objects such that a viewing user would have time to select a given tagged object. According to an embodiment, tags may be inserted if an object may be visible for a sufficient amount of time even if the object is blocked from view intermittently.

Tag server 130 may include information on the tags that may contain pointers to the additional interactive content associated with the video content. The identification and insertion of tags within the video stream may be performed in real time or at regular intervals per the discretion of the content provider based on business agreements or agreements with the user, etc. The tag server 130 is illustrated in FIG. 1 as a remote element, but may be integrated with the prescreening server 128.

Network DVR platform 103 may comprise various DVR recordings or pointers to various DVR recordings, recorded on the network DVR that may be available for viewing to the user. DVR recordings may also be stored locally via a local DVR subsystem 107 connected to the set top box attached to the TV 116. VOD server 102 may provide access to various VOD content items, stored either within the VOD library 101 maintained by the content provider, or the VOD content that may be available via the internet.

As will be described further below, according to an embodiment, when the user selectively requests the additional interactive content, an address field may be populated in a web browser associated with the display device, derived from the metadata associated with the tagged object, which may or may not be hidden to the user. A web query then may be performed based on the inserted website address after which the website HTML experience may be downloaded and rendered to create a hybrid viewing experience (video and Internet content). That is, the interactive additional information/content associated with a tagged object may be accessed from an Internet website. According to an embodiment, the rendered experience may be presented according to a variety of display configurations, including scaling the "being viewed" video content in a video viewer inside the provided Internet-based content, or the video may be managed by the content provider based on the content provider's business agreements with content owners, CE manufacturers, third party advertisers, the user, etc.

VOD server 102, network DVR platform 103, content server 104, prescreening server 128 and tag server 130 may be provided to a server 120 where a data mining engine 122 may be operable to analyze and sort the data and metadata. The associated channel/guide/content/tag data may be cached. The cache 124 is illustrated in FIG. 1 as a remote element, but may be integrated with the server 120 or the client application 108. As new information becomes available, the associated channel/guide/content/tag data may be updated in the cache 124.

The system 100 may include a data services system 126 which may comprise such information as billing data, permissions and authorization data, user profile data, etc., and its data may be stored in a user database 125. The data services system 126 may be accessed by the data mining engine 122 for checking permissions, subscriptions, and profile data for associating tag data 132 to specific users.

As illustrated in FIG. 1, various endpoint devices may be utilized to access video content that can leverage HTML or web technologies to display video content with additional interactive content. For example, endpoint devices may include, but are not limited to, a mobile communication device 110, such as a mobile phone, a computing device 112, such as a desktop computer, a laptop computer, etc., a wireless computing device, such as a tablet computing device 114, a television 116, such as an Internet-connected television or a television connected to a network-connected device, such as a set top box (STB) 118. An endpoint device 110,112,114,116 may be utilized to access a client application 108.

The client application 108 may be operable to receive a request from a user for accessing the additional interactive content that may be tagged within the video stream that can be displayed and rendered on a TV screen, in conjunction with the video service.

As illustrated and described below, an indication of an inserted tag may be provided by the client application 108 to the user in the form of a highlighted object, a three dimensional push, a bold line around the object, a displayed icon, etc. that may indicate the availability of interactive content, etc. A designated button or other selectable control on a remote control or other suitable hard or soft key selection device may be used to request interactive content based on availability. A secondary screen companion device such as a tablet or other hand held computing device with an associated content provision application may also be used to allow the request of the interactive experience on the display screen such as the television 116. Other suitable means for interacting with and controlling available and received content includes touch command, voice command, gesture command and combinations of various functionality interface methods and systems.

Once a user requests access of the additional interactive content through any one of the above mechanisms, the video content being played full screen may be overlaid or replaced by the additional interactive content available that has been associated with the tagged object within the video stream thus creating a web browser-type experience and providing the user with more interactive, additional information and deeper and richer content from the content owner, content provider, third party sponsor or provider, etc. The additional interactive content may also be displayed simultaneously along with the video content in a hybrid fashion in the form of a split screen, banner, picture in picture, on an alternate device, etc.

The additional interactive content may comprise updated information feeds from a social media website associated with the being viewed video content, tailored advertisements, news items, other videos and the like that may be of interest to the user based on user preferences, third party sponsored content, and the like. The associated channel/guide/content/tag data may be stored in a cache 124 located on the server 120, on the application 108, or may be located remotely and accessed via a network.

Figure 2A:
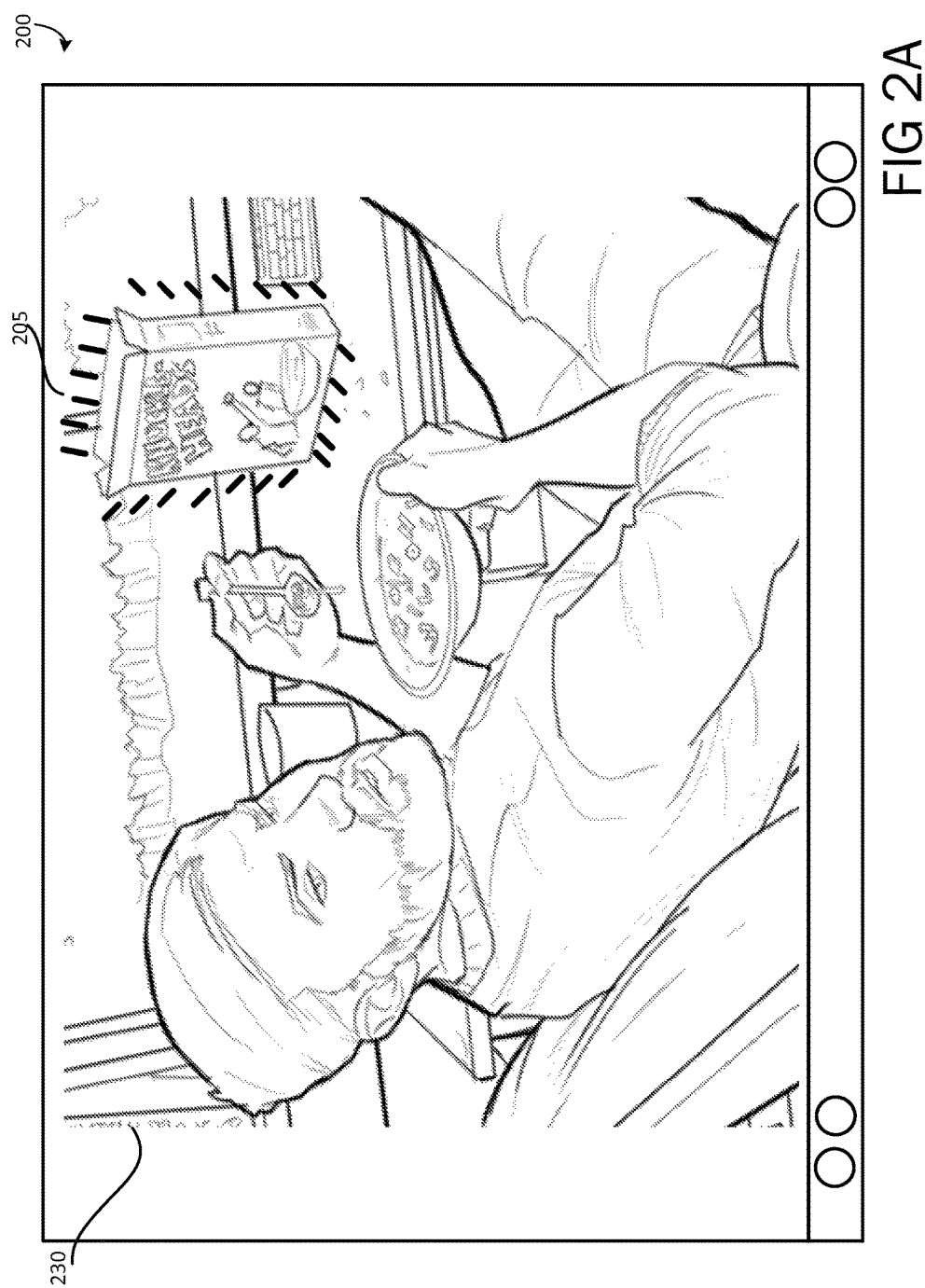
Figure 2B:

FIGS. 2A, 2B and 2C illustrate a user interface 200 through which the application may indicate the availability of interactive content. According to embodiments, the additional interactive content provided via an inserted tag (described herein) may be provided via the user interface. Referring to the user interface 200, as illustrated in FIG. 2A, an indication 205 of additional interactive content tagged to an example cereal box is displayed for the user as a highlighted cereal box. Referring to the user interface 200, as illustrated in FIG. 2B, an indication 210 illustrated around the example tagged cereal box is shown via a bold outline, and an indication 215 illustrated around the example bottle is shown as a glowing effect. Both example indications may both be provided simultaneously during the video content display.

According to one embodiment, during the prescreening of the content, all the associated tags for additional interactive content tagged within the video stream that may be identified may be inserted, but during presentation, only the tags that may be of interest to a specific user may be displayed based on user preferences (including day/time, location, etc.) and/or parental controls set by the primary user, etc. For example, if an indication may be received that the user viewing the video content is a child through various measures such as login, time of day, etc., then the tags may be further refined before being displayed. For example, as illustrated in FIG. 2B, even though tags associated with the cereal box and the soda bottle are both inserted within the video stream, the soda bottle tag may be disabled once a child viewer is identified.

Referring to the user interface 200, as illustrated in FIG. 2C, an indication 220 of additional interactive content tagged to the character is displayed for the user as a highlighted star-shaped icon. The indications 205,210,215 and 220 may be presented for user selection as described herein for accessing the associated additional/interactive content.

As should be appreciated, the indications 205,210,215 and 220 are for purposes of example only and are not exhaustive of the vast number of visual indicators that may be displayed to alert users of the availability of associated interactive content. For example, such an indication may be provided via a displayed banner, mosaic tile, audio alert, text string or the like. For example, according to an embodiment, tags may also be displayed as an HTML hyperlink overlay on top of the video display such that certain sections may be converted to a hyperlink such as hyperlinks occurring during browsing content via the Internet. In addition, a secondary screen companion device, such as a tablet, with an application operative for passing instructions for requesting interactive content may also be used to indicate availability of interactive content and to allow the request and initiation of the interactive experience on the display screen such as the TV 116.

As should be appreciated, the indications 205,210,215 and 220 are some examples of a selectable functionality control that may be used to request additional interactive content associated via various tagged objects on the video display. For example, a selectable control for requesting the interactive content available via an associated tag may be provided via indications 205,210,215 and 220, or may be provided as a designated button or key on a remote control device or on a hard or soft keyboard associated with the viewing device (e.g., TV 116). In addition, an indication may be used to alert a user of the availability of interactive content that may be requested via other means such as voice or gesture activation.

As described above for the user interface 200, an indication 205,210,215 and 220 of available interactive content may be provided through various other means such as banners, mosaic tiles, audio alerts, text strings, or the like, or via a secondary screen companion device, such as a tablet, with an application operative for passing instructions for requesting interactive content may also be used to indicate availability of interactive content and to allow the request and initiation of the interactive experience on the display screen such as the TV 116.

Figure 3:
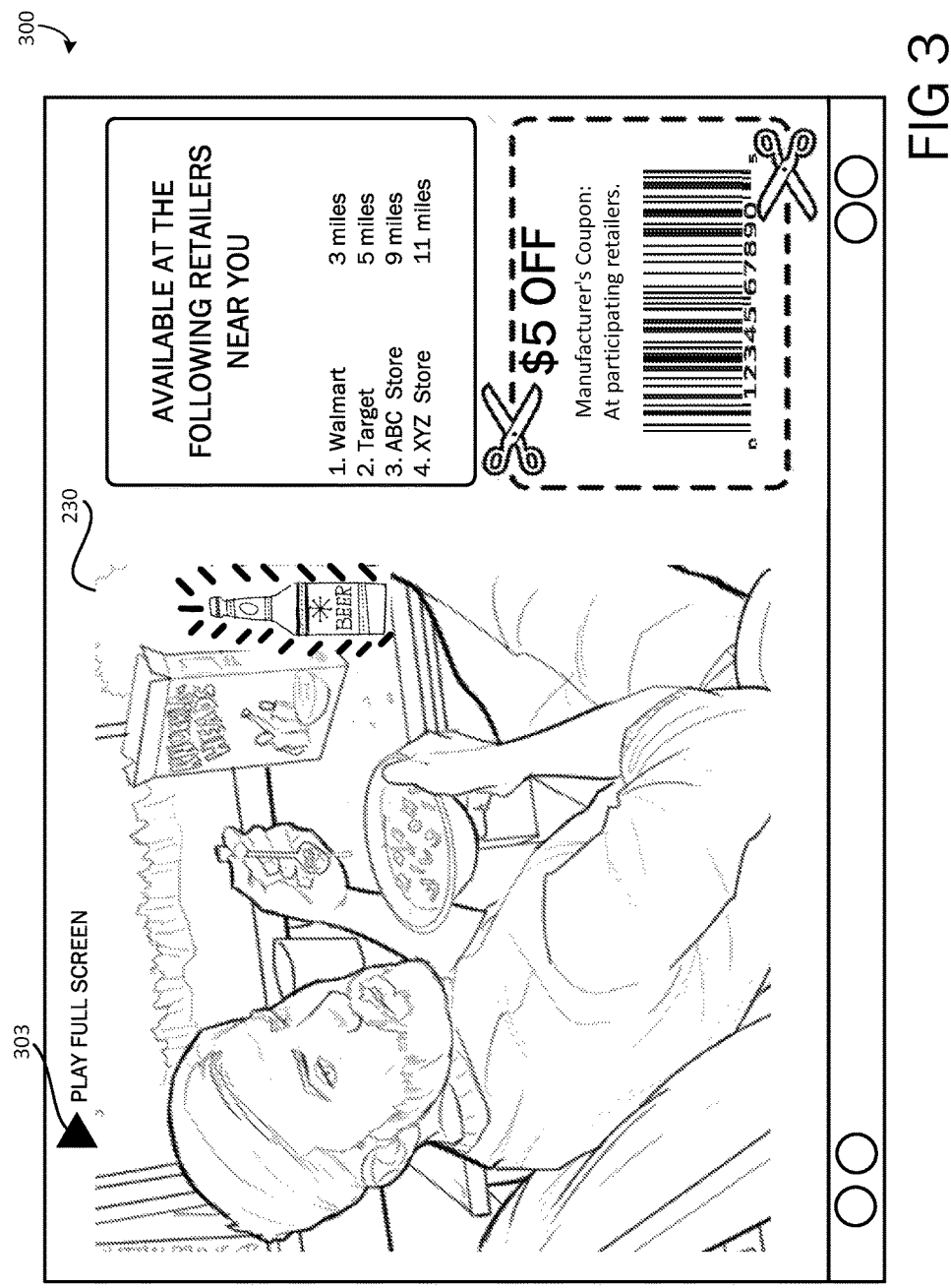
FIG. 3 is an illustration of a user interface displayed on a device wherein video content is being delivered in a hybrid fashion along with additional interactive content.

Referring now to FIG. 3, after requesting the additional interactive content associated with an object within the video stream, as described above, a hybrid interactive video experience may be provided. As can be appreciated, the additional interactive content may be displayed in a variety of different ways per the discretion of the content owner, content provider, etc. For example, upon choosing to experience the additional interactive content associated with the tagged object within the full screen video 230 playing, the hybrid display of video content 230 combined with the interactive additional content may be presented to user as illustrated in FIG. 3.

As should be appreciated, the hybrid interactive video experience illustrated in FIG. 3 is for purposes of example and is not exhaustive of the vast number of layouts that may be provided. The display screen may be presented as an instance of a browser-type display where a variety of content items available may be displayed, and where the full screen video 230 from which the user requested the additional interactive content may be presented in a minimized embedded player with other additional interactive content wrapped around it. Alternatively, each additional interactive content item may be presented in one or more mosaic-type tiles that may be disposed on a display screen while a display of the video content is reduced accordingly. Alternatively, the hybrid content illustrated in FIG. 3 may be provided via a browser within a browser setup (one with the video content and another with the additional content).

According to an embodiment, the associated tags may be automatically updated and inserted based on time of day, content being played or based on action from a user, content creator, content provider, third party content provider or sponsor, or the like. Further, the content provider may also update the tags while performing the prescreening function in real time or at regular intervals based on business agreements in order to display an updated advertisement that may be inserted within the video stream and other content based on any new objects that may be identified based on the updated advertisement or content.

Figure 4:
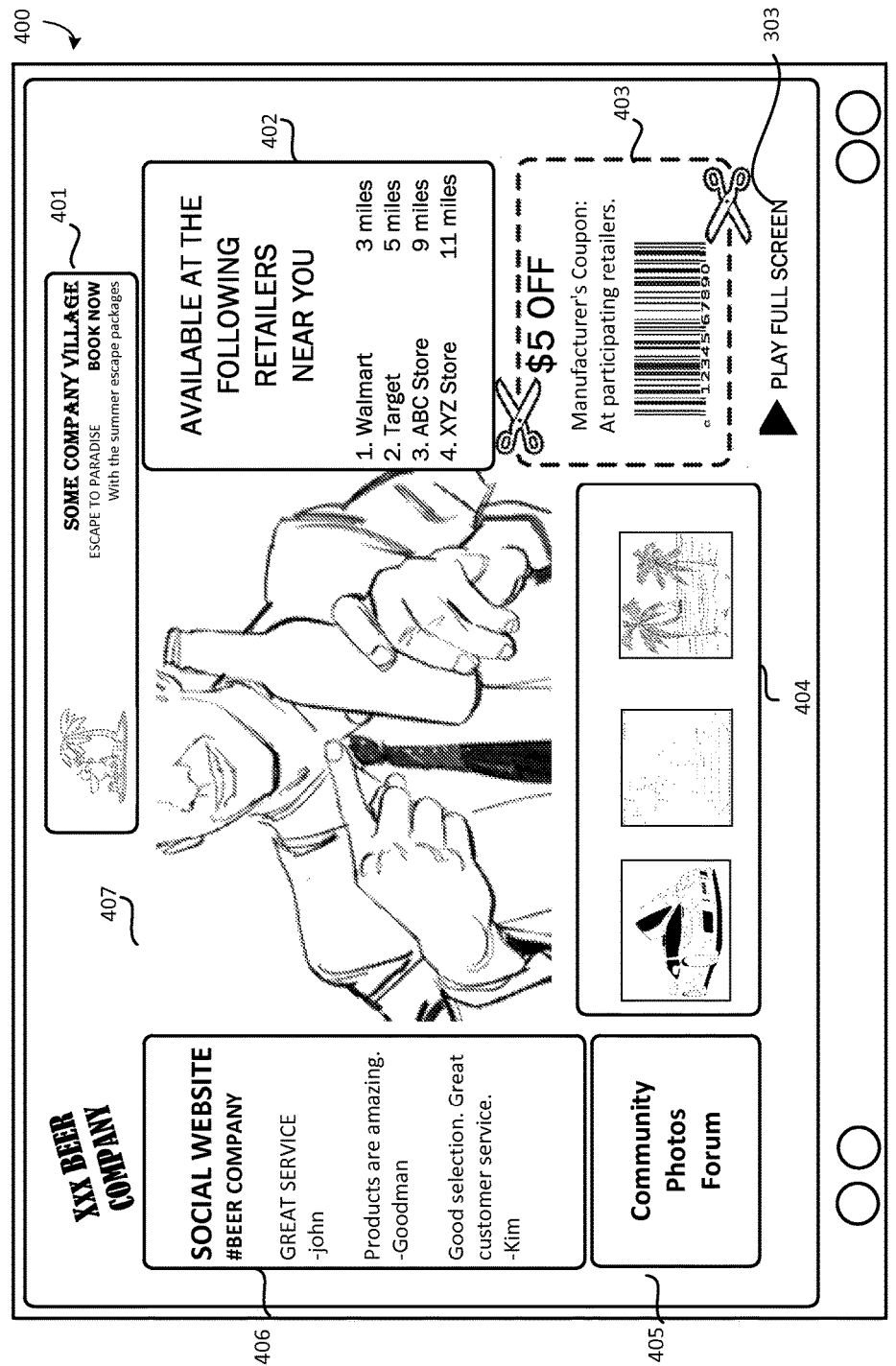
FIG. 4 is an illustration of a user interface displayed on a device wherein additional interactive content is being provided via a browsing experience.

Referring to FIG. 4, the additional interactive content may be displayed full screen in a browser like display wherein the additional content associated with the tagged object (e.g., soda bottle) may be displayed. Additional content such as the social website comments 406 of people who may have used the product, community photos forum 405, other videos 404 that may belong to the same content owner or may be sponsored by one or more sponsoring parties, other third party advertisements 401 may be displayed. Other information 402 such as the retailers that may carry the product, manufacturer's coupon 403, etc. may be displayed. According to an embodiment, content providers may manage the additional content described herein based on various business agreements in place with the users, content owners, CE manufactures, etc.

According to embodiments, a selective button 303 to revert back to the full screen video display 230 (as shown in FIGS. 2A, 2B and 2C) may be provided when rendering the additional interactive content in a hybrid fashion or a full screen fashion as illustrated in FIGS. 3 and 4 respectively.

Figure 5:
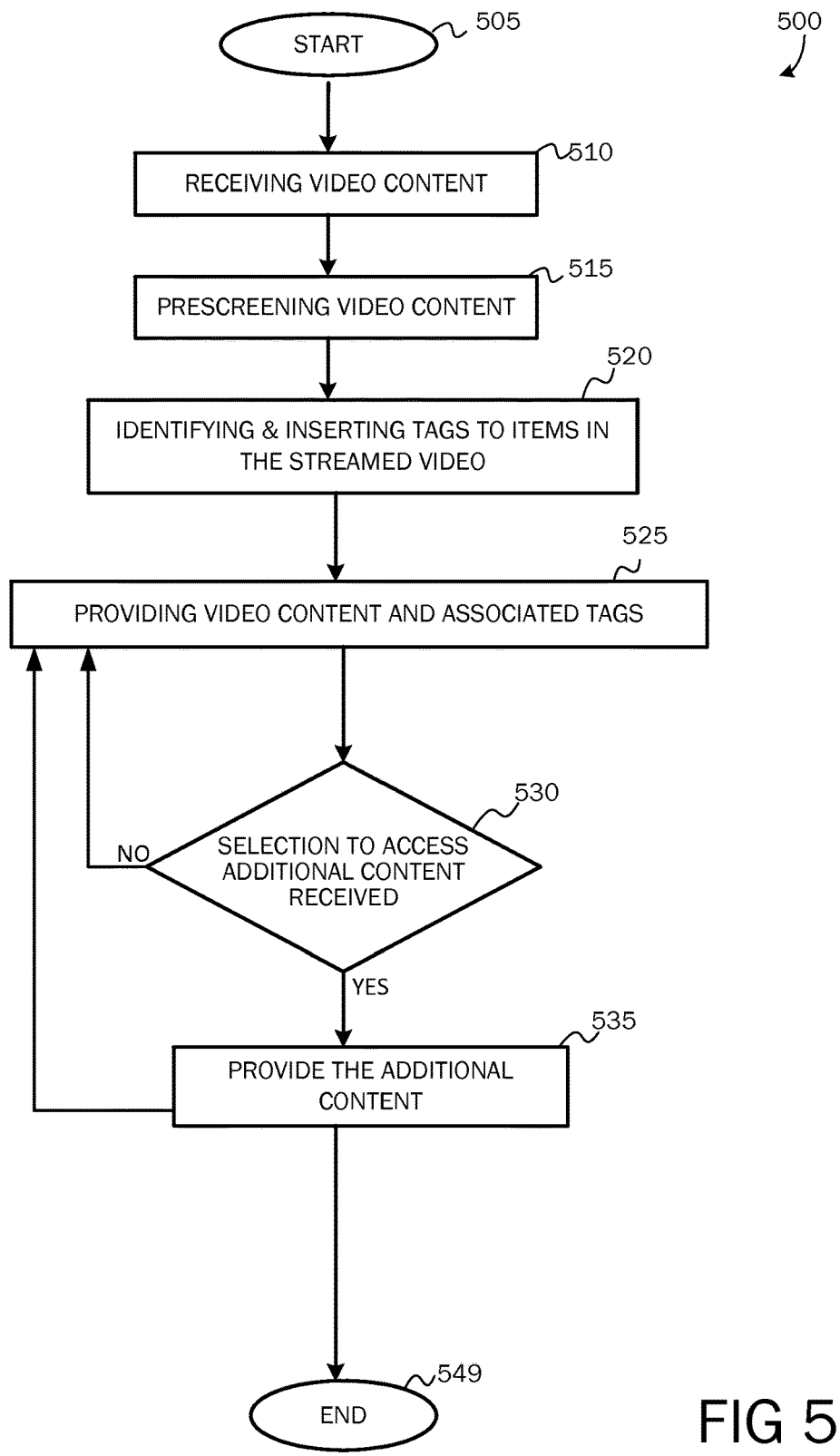
FIG. 5 is a flow chart of a method for providing selectable additional interactive content within a video stream.

FIG. 5 is a flow chart of a method 500 for providing selectable content within a video stream. The method 500 begins at OPERATION 505 and proceeds to OPERATION 510 where the video content available to the content provider is received at the prescreening server 128. The video content available to the content provider may include, but is not limited to, the Internet channels and linear channels data and metadata available via the content server 104, VOD content available via the VOD server 102, DVR content available via the local DVR subsystem 107 and the network DVR platform 103, etc. The method 500 then proceeds to OPERATION 515 where the prescreening of the available video content takes place. The method 500 proceeds to OPERATION 520 where the objects within the video stream may be identified as potential objects that may be tagged for association with additional interactive content available to the content provider.

In the case of linear content and live broadcast, prescreening may be based on predictions of when/where objects may be presented in the video content. For example, for a live broadcast of a sports show, predictions may be made based on sporting event sponsoring companies as to what would be the additional content that may apply to tagged objects and what kinds of objects that viewers may expect to view. According to embodiments, various objects may be identified by display characteristics, for example, by shapes, pixel numbers, pixel values, etc., and then while the live content is being broadcast, tags may be inserted for various objects in association with available interactive content. For example, if a logo (e.g., a product brand logo) may be detected based on shape and the logo may be tagged for associating the logo with interactive content as described herein. For another example, such an identification may be made based on characters that are expected to be seen such as the characters making up a name.

The method 500 proceeds to OPERATION 525, where the video content with the associated tagged objects may be displayed for the user on the viewing device. The inserted tagged objects may be highlighted via one or more means that may attract the user's attention, as described above.

Once the viewer identifies a given tagged object that may have additional information of interest to the user, the method 500 proceeds to DECISION OPERATION 530 where a selection may be made by the user to access the associated additional interactive content. If the user selectively indicates to access the additional interactive content, the method 500 proceeds to OPERATION 535 where the additional interactive content may be presented to the user, as illustrated in FIGS. 3 and 4.

Prior to rendering the additional interactive content to the user, if the user is viewing linear content or a live broadcast, a check may be performed if the user's system has the ability to record the video content, if the user may record, then he/she may be given an option to record the linear video while consuming the additional content. If the user chooses to record the linear content while consuming the additional content, then once the additional interactive content is delivered, the user may be switched back to the same point of the video content. If the user may not record or chooses not to use record capabilities, when the user finishes consuming the additional interactive content and is switched back to the video content display, then he/she may be taken to that point of the linear video that is being presented at the current time.

In case of the non-linear video content delivery, when the user chooses to selectively indicate to access the additional interactive content at DECISION OPERATION 530 and consumes the same in a browser like fashion as illustrated in FIG. 4, the system would in effect pause the non-linear video content while the user is consuming the additional content. When the user finishes consuming the additional content, he/she may be taken back to the same point in the non-linear content from which he/she departed to view the additional content. In either case, if the additional interactive content is consumed in a hybrid fashion as illustrated in FIG. 3, the video content will continue to be displayed as the additional interactive content is delivered simultaneously.

At OPERATION 535, the additional interactive content may be presented to the user in a number of different ways such as a split on the display screen with the additional interactive content and the video content simultaneously rendered to the viewer as illustrated in FIG. 3, or the additional interactive content may take form of a browser window which may be overlaid on top of the video content display as illustrated in FIG. 4.

If at DECISION OPERATION 530, the user does not selectively access the additional interactive content, the method 500 reverts back to operation 525, where it may continue to render the video content with the associated tags.

According to an embodiment, after the video content is completely delivered to the user, at the conclusion of the broadcast of the being viewed video content, all of the associated tags that were inserted in the video stream may be displayed so that the viewer may have an opportunity to access all of the additional interactive content associated with that video content, if desired.

The method 500 ends at OPERATION 595.

According to another embodiment, if linear content or live broadcast with tagged objects is being presented, and if the user does wish to access the additional content, there may be only hybrid viewing option available to access the additional interactive content due to business rules. In such cases, according to embodiments, even if the full screen browsing experience is enabled for certain tagged objects, such browsing experience may only be available during commercial breaks and the additional content may be restricted to the additional content that belongs to content owner of the advertisement. Navigation away from the broadcast may be restricted due to business agreements. If the additional content is presented to the user, provided the user selectively indicates to access it, it may only be provided in a hybrid fashion such as a banner, a spilt screen, to an alternate device or a picture in a picture type display where the broadcast content may continue to be displayed along with the simultaneous display of the additional content. For example, in the case of a commercial break during a live broadcast, the tagged items within a commercial presentation may provide additional content in a form that may be limited to the domain of the commercial sponsor's website. Even if the browsing experience of additional interactive content is enabled during the commercial break, once the commercial break ends, irrespective of the fact that the user may or may not have finished consuming the additional interactive content, the display may be switched back to the live broadcast. According to yet another embodiment, once the display is switched back to the live broadcast, the additional content may continue to be rendered in a banner form, split screen, picture in picture form, on an alternate device, or the like.

Figure 6:
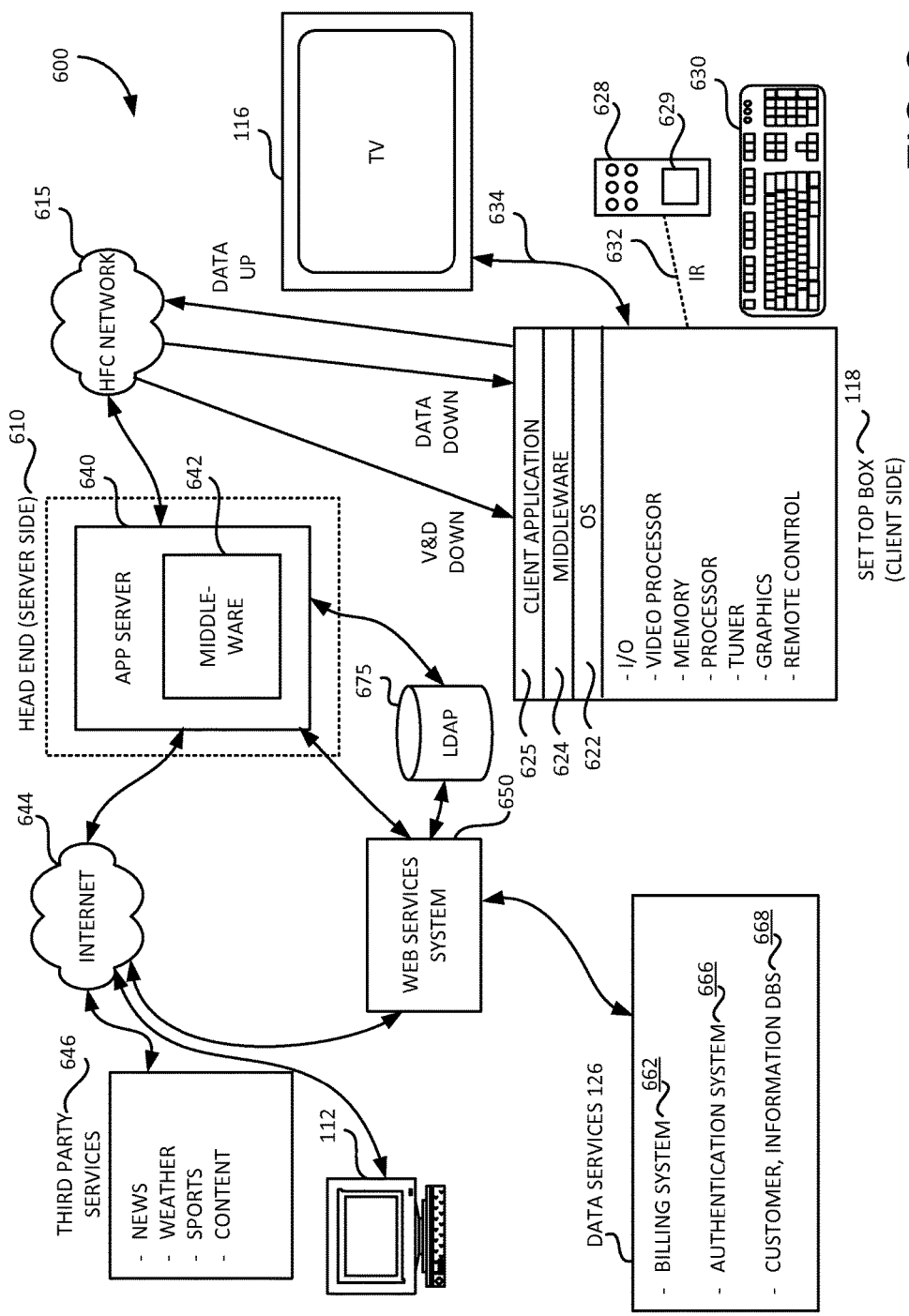
FIG. 6 is a simplified block diagram illustrating a cable television services system architecture providing an operating environment according to an embodiment.

FIG. 6 is a simplified block diagram illustrating a cable television services system 600 (hereafter referred to as "CATV") architecture providing an operating environment according to an embodiment. As should be appreciated, a CATV services system 600 is but one of various types of systems that may be utilized for providing an operating environment for providing dynamic URL insertion. Referring now to FIG. 6, digital and analog video programming, information content and interactive television services are provided via a hybrid fiber coax (HFC) network 615 to a television set 116 for consumption by a cable television/ services system customer. As is known to those skilled in the art, HFC networks 615 combine both optical fiber and coaxial cable lines. Typically, optical fiber runs from the cable head end 610 to neighborhoods of subscribers. Coaxial cable runs from the optical fiber feeders to each customer or subscriber. The functionality of the HFC network 615 allows for efficient bidirectional data flow between the client-side set-top box 118 and the server-side application server 640 of the embodiment.

The CATV system 600 is in the form of a distributed client-server computing system for providing video and data flow across the HFC network 615 between server-side services providers (e.g., cable television/services providers) via a server-side head end 610 and a client-side customer via a client-side set-top box (STB) 118 functionally connected to a customer receiving device, such as the television set 116. As is understood by those skilled in the art, modern CATV systems 600 may provide a variety of services across the HFC network 615 including traditional digital and analog video programming, telephone services, high speed Internet access, video-on-demand, and information services.

On the client side of the CATV system 600, digital and analog video programming and digital and analog data are provided to the customer television set 116 via the set-top box (STB) 118. Interactive television services that allow a customer to input data to the CATV system 600 likewise are provided by the STB 118. As illustrated in FIG. 6, the STB 118 is a multipurpose computing device having a computer processor, memory, and an input/output mechanism. The input/output mechanism receives input from server-side processes via the HFC network 615 and from customers via input devices such as the remote control device 628, keyboard 630, or other computing device 112, such as a tablet/ slate computer 114, smart phone 110, etc. The remote control device 628 and the keyboard 630 may communicate with the STB 118 via a suitable communication transport such as the infrared connection 632. The remote control device 628 may include a biometric input module 629. The STB 118 also includes a video processor for processing and providing digital and analog video signaling to the television set 116 via a cable communication transport 634. A multi-channel tuner is provided for processing video and data to and from the STB 118 and the server-side head end system 610, described below.

The STB 118 also includes an operating system 622 for directing the functions of the STB 118 in conjunction with a variety of client applications 625. For example, if a client application 625 requires a news flash from a third-party news source to be displayed on the television 116, the operating system 622 may cause the graphics functionality and video processor of the STB 118, for example, to output the news flash to the television 116 at the direction of the client application 625 responsible for displaying news items.

Because a variety of different operating systems 622 may be utilized by a variety of different brands and types of set-top boxes, a middleware layer 624 may be provided to allow a given software application to be executed by a variety of different operating systems. According to an embodiment, the middleware layer 624 may include a set of application programming interfaces (APIs) that are exposed to client applications 625 and operating systems 622 that allow the client applications to communicate with the operating systems through common data calls understood via the API set. As described below, a corresponding middleware layer is included on the server side of the CATV system 600 for facilitating communication between the server-side application server and the client-side STB 118. The middleware layer 642 of the server-side application server and the middleware layer 624 of the client-side STB 118 may format data passed between the client side and server side according to the Extensible Markup Language (XML).

According to one embodiment, the set-top box 118 passes digital and analog video and data signaling to the television 116 via a one-way communication transport 634. According to other embodiments, two-way communication transports may be utilized, for example, via high definition multimedia (HDMI) ports. The STB 118 may receive video and data from the server side of the CATV system 600 via the HFC network 615 through a video/data downlink and data via a data downlink. The STB 118 may transmit data from the client side of the CATV system 600 to the server side of the CATV system 600 via the HFC network 615 via one data uplink. The video/data downlink is an "in band" downlink that allows for digital and analog video and data signaling from the server side of the CATV system 600 through the HFC network 615 to the set-top box 118 for use by the STB 118 and for distribution to the television set 116. As is understood by those skilled in the art, the "in band" signaling space operates at a relative high frequency, e.g., between 54 and 1000 megahertz. The signaling space is generally divided into 6 megahertz channels in which may be transmitted as a single analog signal or a greater number (e.g., ten) of digital signals.

The data downlink and the data uplink, illustrated in FIG. 6, between the HFC network 615 and the set-top box 118 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side set-top box 118 and the server-side application server 640 is typically passed through the "out of band" data links. Alternatively, an "in band" data carousel may be positioned in an "in band" channel into which a data feed may be processed from the server-side application server 640 through the HFC network 615 to the client-side STB 118. Operation of data transport between components of the CATV system 600, described with reference to FIG. 6, is well known to those skilled in the art.

Referring still to FIG. 6, the head end 610 of the CATV system 600 is positioned on the server side of the CATV system and includes hardware and software systems responsible for originating and managing content for distributing through the HFC network 615 to client-side STBs 118 for presentation to customers via televisions 116. As described above, a number of services may be provided by the CATV system 600, including digital and analog video programming, interactive television services, telephone services, video-on-demand services, targeted advertising, and provision of information content.

The application server 640 is a general-purpose computing system operative to assemble and manage data sent to and received from the client-side set-top box 118 via the HFC network 615. As described above with reference to the set-top box 118, the application server 640 includes a middleware layer 642 for processing and preparing data from the head end of the CATV system 600 for receipt and use by the client-side set-top box 118. For example, the application server 640 via the middleware layer 642 may obtain data from third-party services 646 via the Internet 644 for transmitting to a customer through the HFC network 615 and the set-top box 118. For example, content metadata a third-party content provider service may be downloaded by the application server via the Internet 644. When the application server 640 receives the downloaded content metadata, the middleware layer 642 may be utilized to format the content metadata for receipt and use by the set-top box 118. Therefore, content metadata may be sent and categorized based on the availability to the customer's program guide data.

According to one embodiment, data obtained and managed by the middleware layer 642 of the application server 640 is formatted according to the Extensible Markup Language and is passed to the set-top box 118 through the HFC network 615 where the XML-formatted data may be utilized by a client application 625 in concert with the middleware layer 624, as described above. As should be appreciated by those skilled in the art, a variety of third-party services data, including news data, weather data, sports data and other information content may be obtained by the application server 640 via distributed computing environments such as the Internet 644 for provision to customers via the HFC network 615 and the set-top box 118. According to embodiments, client application 640 may include the client application 108 described herein.

According to embodiments, the application server 640 obtains customer support services data, including billing data, information on customer work order status, answers to frequently asked questions, services provider contact information, and the like from data services 126 for provision to the customer via an interactive television session. As illustrated in FIG. 6, the services provider data services 126 include a number of services operated by the services provider of the CATV system 600 which may include data on a given customer.

A billing system 662 may include information such as a customer's name, street address, business identification number, Social Security number, credit history, and information regarding services and products subscribed to by the customer. According to embodiments, the billing system 662 may also include billing data for services and products subscribed to by the customer for bill processing, billing presentment and payment receipt.

A customer information database 668 may include general information about customers such as place of employment, business address, business telephone number, and demographic information such as age, gender, educational level, and the like. The customer information database 668 may also include information on pending work orders for services or products ordered by the customer. The customer information database 668 may also include general customer information such as answers to frequently asked customer questions and contact information for various service provider offices/departments. As should be understood, this information may be stored in a variety of disparate databases operated by the cable services provider.

Referring still to FIG. 6, web services system 650 is illustrated between the application server 640 and the data services 126. According to embodiments, web services system 650 serves as a collection point for data requested from each of the disparate data services systems comprising the data services 126. According to embodiments, when the application server 640 requires customer services data from one or more of the data services 126, the application server 640 passes a data query to the web services system 650. The web services system formulates a data query to each of the available data services systems for obtaining any required data for a requesting customer as identified by a set-top box identification associated with the customer. The web services system 650 serves as an abstraction layer between the various data services systems and the application server 640. That is, the application server 640 is not required to communicate with the disparate data services systems, nor is the application server 640 required to understand the data structures or data types utilized by the disparate data services systems. The web services system 650 is operative to communicate with each of the disparate data services systems for obtaining necessary customer data. The customer data obtained by the web services system is assembled and is returned to the application server 640 for ultimate processing via the middleware layer 642, as described above.

An authentication system 666 may include information such as secure user names, subscriber profiles, subscriber IDs, and passwords utilized by customers for access to network services. As should be understood by those skilled in the art, the disparate systems 650, 662, 666, 668 may be integrated or provided in any combination of separate systems, wherein FIG. 6 shows only one example.

Figure 7:
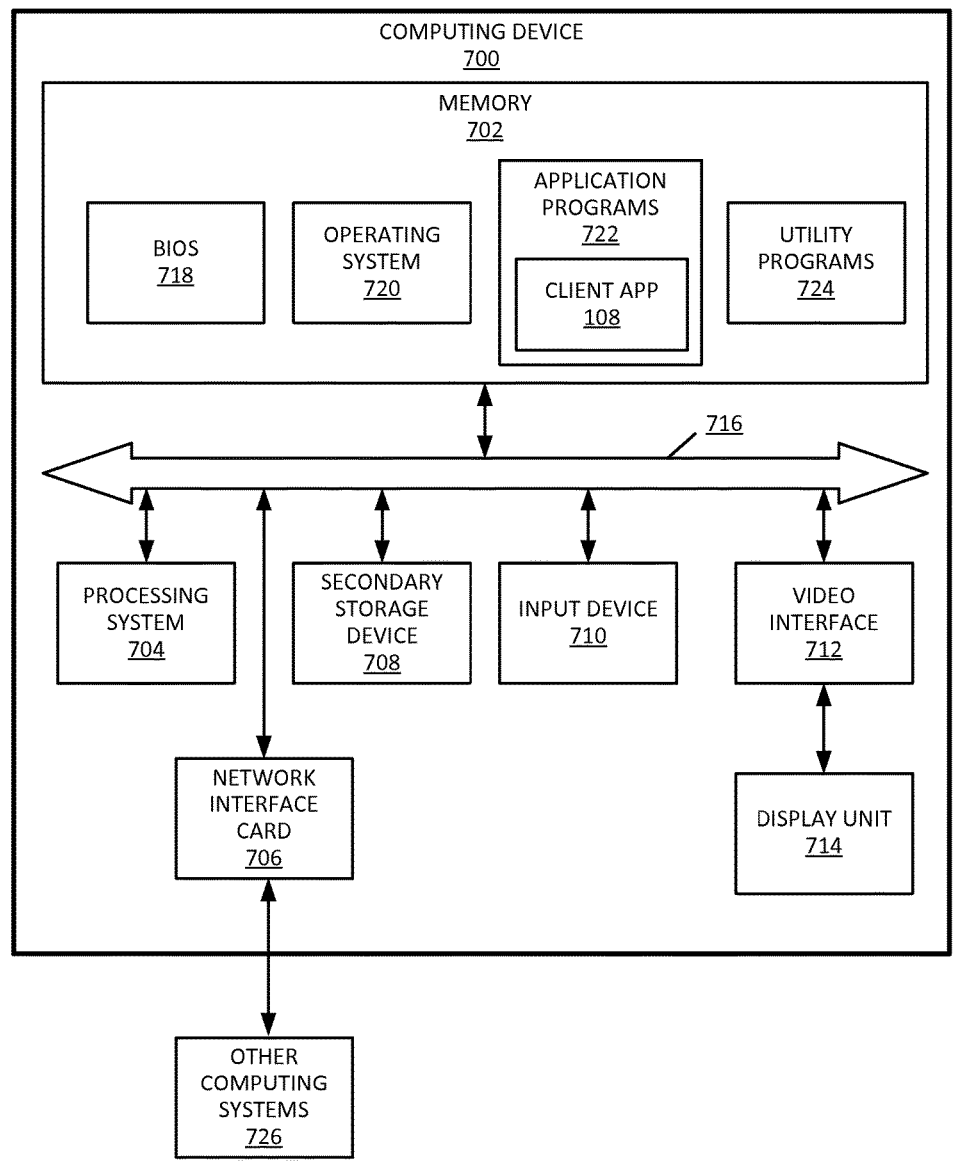
FIG. 7 is a simplified block diagram illustrating example physical components of a computing device with which embodiments may be practiced.

FIG. 7 is a simplified block diagram illustrating example physical components of a computing device 700 with which embodiments may be practiced. In some embodiments, one or a combination of the components 108,110,112,114,116, 118,120,122,124,126 of system 100 may be implemented using one or more computing devices like the computing device 700. It should be appreciated that in other embodiments, components 108,110,112,114,116,118,120,122,124, 126 of system 100 may be implemented using computing devices having hardware components other than those illustrated in the example of FIG. 7.

Computing devices may be implemented in different ways in different embodiments. For instance, in the example of FIG. 7, the computing device 700 includes a processing system 704, memory 702, a network interface 706, a secondary storage device 708, an input device 710, a video interface 712, a display unit 714, and a communication medium 716. In other embodiments, the computing device 700 may be implemented using more or fewer hardware components (e.g., a video interface, a display unit, or an input device) or in combination with other types of computer systems and program modules 726.

The memory 702 includes one or more computer-readable storage media capable of storing data and/or computer-executable instructions. According to one embodiment, the client application 108 may be stored locally on computing device 700. Memory 702 thus may store the computer-executable instructions that, when executed by processor 704, cause the client application 108 to allow users to jump to desired channels by entering a request based information such as channel name, logo, call letter, or programs as described above with reference to FIGS. 1-6.

In various embodiments, the memory 702 is implemented in various ways. For example, the memory 702 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 704 includes one or more processing units, which may include tangible integrated circuits that selectively execute computer-executable instructions. In various embodiments, the processing units in the processing system 704 are implemented in various ways. For example, the processing units in the processing system 704 can be implemented as one or more processing cores. In this example, the processing system 704 can comprise one or more Intel Core microprocessors. In another example, the processing system 704 can comprise one or more separate microprocessors. In yet another example embodiment, the processing system 704 can comprise Application-Specific Integrated Circuits (ASICs) that provide specific functionality. In yet another example, the processing system 704 provides specific functionality by using an ASIC and by executing computer-executable instructions.

The computing device 700 may be enabled to send data to and receive data from a communication network via a network interface card 706. In different embodiments, the network interface card 706 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 708 includes one or more computer-readable storage media, and may store data and computer-executable instructions not directly accessible by the processing system 704. That is, the processing system 704 performs an I/O operation to retrieve data and/or computer-executable instructions from the secondary storage device 708. In various embodiments, the secondary storage device 708 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 710 enables the computing device 700 to receive input from a user. Example types of input devices include, but are not limited to, keyboards, mice, trackballs, stylus input devices, key pads, microphones, joysticks, touch-sensitive display screens, and other types of devices that provide user input to the computing device 700.

The video interface 712 outputs video information to the display unit 714. In different embodiments, the video interface 712 is implemented in different ways. For example, the video interface 712 is a video expansion card. In another example, the video interface 712 is integrated into a motherboard of the computing device 700. In various embodiments, the display unit 714 can be a an LCD display panel, a touch-sensitive display panel, an LED screen, a projector, a cathode-ray tube display, or another type of display unit. In various embodiments, the video interface 712 communicates with the display unit 714 in various ways. For example, the video interface 712 can communicate with the display unit 714 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 716 facilitates communication among the hardware components of the computing device 700. In different embodiments, the communications medium 716 facilitates communication among different components of the computing device 700. For instance, in the example of FIG. 7, the communications medium 716 facilitates communication among the memory 702, the processing system 704, the network interface card 706, the secondary storage device 708, the input device 710, and the video interface 712. In different embodiments, the communications medium 716 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 702 stores various types of data and/or software instructions. For instance, in the example of FIG. 7, the memory 702 stores a Basic Input/Output System (BIOS) 718, and an operating system 720. The BIOS 718 includes a set of software instructions that, when executed by the processing system 704, cause the computing device 700 to boot up. The operating system 720 includes a set of software instructions that, when executed by the processing system 704, cause the computing device 700 to provide an operating system that coordinates the activities and sharing of resources of the computing device 700. The memory 702 also stores one or more application programs 722 that, when executed by the processing system 704, cause the computing device 700 to provide applications to users, for example, the client application 108. The memory 702 also stores one or more utility programs 724 that, when executed by the processing system 704, cause the computing device 700 to provide utilities to other software programs.

Embodiments of the present invention may be utilized in various distributed computing environments where tasks are performed by remote processing devices that are linked through a communications network in a distributed computing environment.

Figures 8A, 8B:
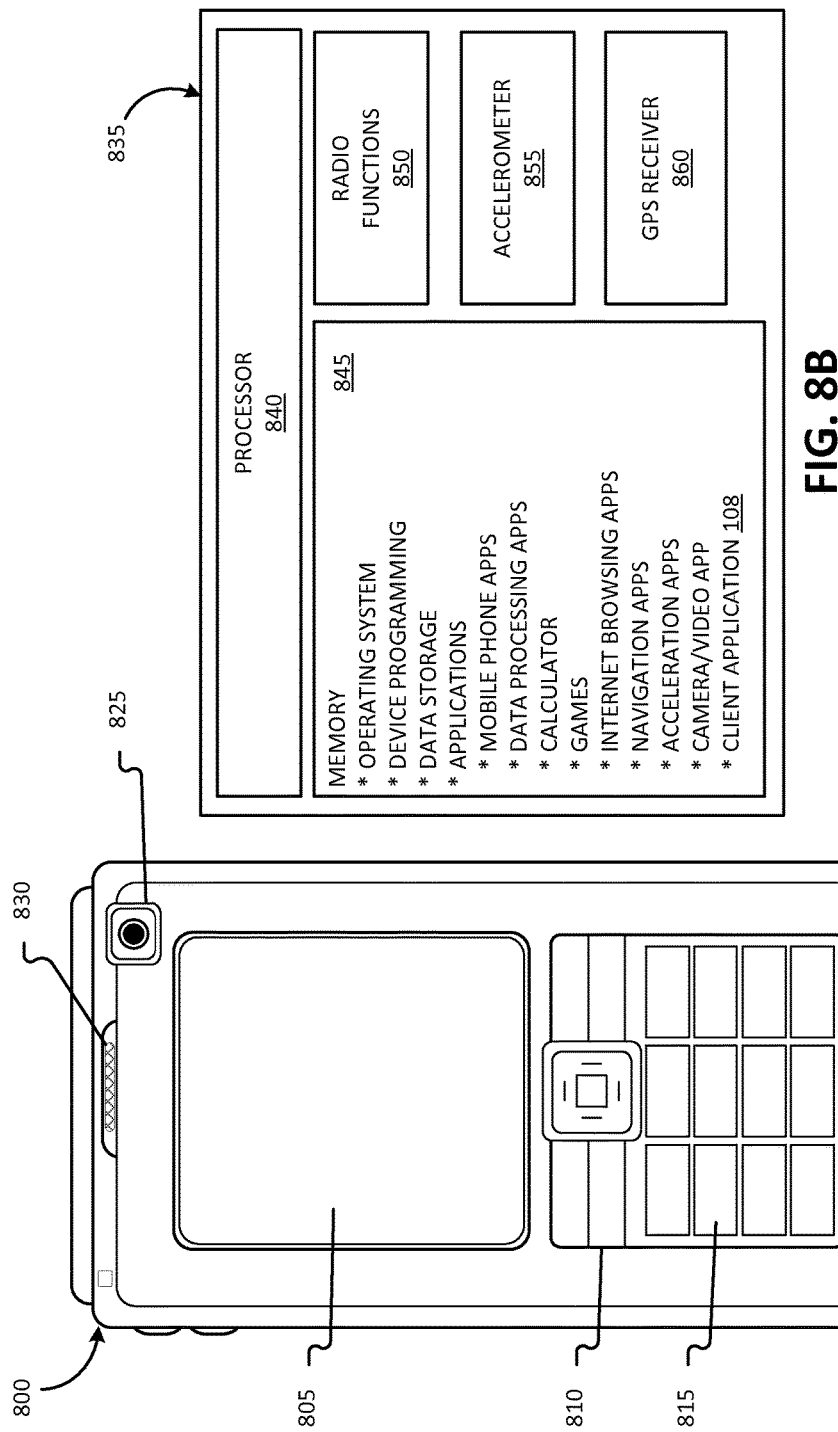
FIGS. 8A and 8B illustrate a suitable mobile computing environment with which embodiments may be practiced.

FIGS. 8a-b illustrate a suitable mobile computing environment, for example, a mobile computing device 110, a smart phone, a tablet personal computer 114, a laptop computer 112, and the like, with which embodiments may be practiced. The mobile computing device 800 is illustrative of any suitable device operative to send, receive and process wireless communications according to embodiments of the present invention. A display screen 805 is operative for displaying a variety of information such as information about incoming and outgoing communications, as well as, a variety of data and displayable objects, for example, text, alphanumeric data, photographs, and the like.

Data input to the device 800 may be performed via a variety of suitable means, such as, touch screen input via the display screen 805, keyboard or keypad input via a data entry area 810, key input via one or more selectable buttons or controls 815, voice input via a microphone 818 disposed on the device 800, photographic input via a camera 825 functionality associated with the mobile computing device, or any other suitable input means. Data may be output via the device 800 via any suitable output means, including but not limited to, display on the display screen 805, audible output via an associated speaker 830 or connected earphone system, vibration module for providing tactile output, and the like.

Referring now to FIG. 8b, operational unit 835 is illustrative of internal operating functionality of the mobile computing device 800. A processor 840 is illustrative of a general purpose computer processor for processing incoming and outgoing data and communications and controlling operation of the device and associated software applications via a mobile computing device operating system. Memory 845 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, the client application 108 may be stored locally on mobile computing device 800.

Mobile computing device 800 may contain an accelerometer 855 for detecting acceleration, and can be used to sense orientation, vibration, and/or shock. Mobile computing device 800 may contain a global positioning system (GPS) system (e.g., GPS send/receive functionality) 860. A GPS system 860 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 850 include all required functionality, including onboard antennae, for allowing the device 800 to communicate with other communication devices and systems via a wireless network. Radio functions 850 may be utilized to communicate with a wireless or WIFI-based positioning system to determine a device's 800 location.

Although described herein in combination with mobile computing device 800, in alternative embodiments the invention may be used in combination with any number of computer systems, such as in desktop environments, laptop or notebook computer systems, multiprocessor systems, micro-processor based or programmable consumer electronics, networked PCs, mini computers, main frame computers and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-8. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

We claim:

1. A method comprising:
prescreening a video content item before transmitting the video content item to a subscriber including:
identifying objects in scenes of the video content item to link with additional interactive content, wherein the identifying includes analyzing moving objects to determine whether a moving object of a scene can be selected according to a speed of movement of the moving object in the scene;
generating tags to apply to the identified objects of each scene of the video content item including the moving objects that can be selected according to the speed of movement of each moving object in the scene to enable selection of tagged objects with input operations; and
applying the tags to the identified objects including the moving objects that can be selected according to the speed of movement of each moving object to link and allow access to the additional interactive content following each input operation according to a day/time of viewing, a viewing history, and a device in use for viewing;
providing the video content item, wherein one or more tagged objects in a scene of the video content item allow access, following an input operation, to one or more feeds from a social media website associated with the subscriber;
providing an indication of one or more of the tagged objects by displaying a tagged object in a scene of the video content item that indicates that the tagged object is selectable with the input operation;
receiving the input operation to access the additional interactive content associated with each tagged object;
retrieving the additional interactive content; and
displaying the additional interactive content with the video content item, wherein the displaying of the additional interactive content with the video content item includes displaying only the additional interactive content of interest to the subscriber in response to the input operation.

2. The method of claim 1, further comprising displaying the indication as a hyperlink overlaid on the video content item.

3. The method of claim 1, further comprising:
determining the video content item is a linear video content item;
determining digital video recording is available;
pausing and recording the video content item while rendering the additional interactive content; and
resuming playback of the video content item after the additional interactive content is rendered.

4. The method of claim 1, further comprising displaying the additional interactive content in a format optimized for a viewing device.

5. The method of claim 1, further comprising identifying an object in the scene to link with the additional interactive content according to subscriber information that includes:
a location;
content available;
prior selections of tagged objects to access the additional interactive content;
demographics; and
parental controls.

6. The method of claim 1, wherein prescreening the video content item is performed in real time or at regular intervals as based on one or more of:
business rules;
agreements with customers;
agreement with content owners;
upcoming events; or
sponsored events.

7. The method of claim 1, further comprising identifying an object based on a pixel value.

8. The method of claim 1, further comprising, after completely delivering the video content item, enabling a display of all inserted tags associated the video content item.

9. The method of claim 1, further comprising refining the tags that indicate availability of the additional interactive content based on received login parameters.

10. A system comprising:
a memory storage; and
one or more processors coupled to the memory storage, wherein the one or more processors are operable to:
prescreen a video content item before transmitting the video content item to a subscriber that:
identifies objects in scenes of the video content item to link with additional interactive content, wherein to identify includes analyzing moving objects to determine whether a moving object of a scene can be selected according to a speed of movement of the moving object in the scene;
generates tags to apply to the identified objects of each scene of the video content item including the moving objects that can be selected according to the speed of movement of each moving object in the scene to enable selection of tagged objects with input operations; and
tags the identified objects including the moving objects that can be selected according to the speed of movement of each moving object to link and allow access to the additional interactive content following each input operation according to a day/time of viewing, a viewing history, and a device in use for viewing;
provide the video content item, wherein one or more tagged objects in a scene of the video content item allow access, subsequent to an input operation, to one or more feeds from a social media website associated with the subscriber;
provide an indication of one or more of the tagged objects by displaying a tagged object in a scene of the video content item that indicates that the tagged object is selectable with the input operation;
receive the input operation to access the additional interactive content associated with each tagged object;
retrieve the additional interactive content; and
display the additional interactive content with the video content item, wherein the display of the additional interactive content with the video content item includes the display of only interactive content of interest to the subscriber in response to the input operation.

11. The system of claim 10, wherein the one or more processors are operable to provide an indication of a tagged object.

12. The system of claim 10, wherein the one or more processors are further operable to:

determine the video content item is a linear video content;
determine digital video recording is available;
pause and record the video content item while rendering the additional interactive content; and
resume playback of the video content item after the additional interactive content is rendered.

13. The system of claim 10, wherein the one or more processors are further operable to display the additional interactive content in a format optimized for a viewing device.

14. The system of claim 10, wherein the one or more processors are operable to identify an object in the scene to link with the additional interactive content according to subscriber information that includes:
a location;
content available;
prior selections of tagged objects to access the additional interactive content;
demographics; and
parental controls.

15. The system of claim 10, wherein the one or more processors are operable to prescreen the video content item in real time or at regular intervals as based on one or more of:
business rules;
agreements with customers;
agreement with content owners;
upcoming events; or
sponsored events.

16. The system of claim 10, wherein the one or more processors are operable to identify the object based on a pixel value.

17. A non-transitory computer readable medium having computer-executable instructions for:
prescreening a video content item before transmitting the video content item to a subscriber including:
identifying objects in scenes of the video content item to link with additional interactive content, wherein the identifying includes analyzing moving objects to determine whether a moving object of a scene can be selected according to a speed of movement of the moving object in the scene;
generating tags to apply to the identified objects of each scene of the video content item including the moving objects that can be selected according to the speed of movement of each moving object in the scene to enable selection of tagged objects with input operations; and
applying the tags to the identified objects including the moving objects that can be selected according to the speed of movement of each moving object to link and allow access to the additional interactive content following each input operation according to a day/time of viewing, a viewing history, and a device in use for viewing;
providing the video content item, wherein one or more tagged objects in a scene of the video content item allow access, following an input operation, to one or more feeds from a social media website associated with the subscriber;
providing an indication of one or more of the tagged objects by displaying a tagged object in a scene of the video content item that indicates that the tagged object is selectable with the input operation;
receiving the input operation to access the additional interactive content associated with each tagged object;
retrieving the additional interactive content;
displaying the additional interactive content with the video content item, wherein the displaying of the additional interactive content with the video content item includes displaying only interactive content of interest to the subscriber in response to the input operation; and
enabling pausing and recording of the video content item while displaying the additional interactive content.

\* \* \* \* \*